Figure 1:
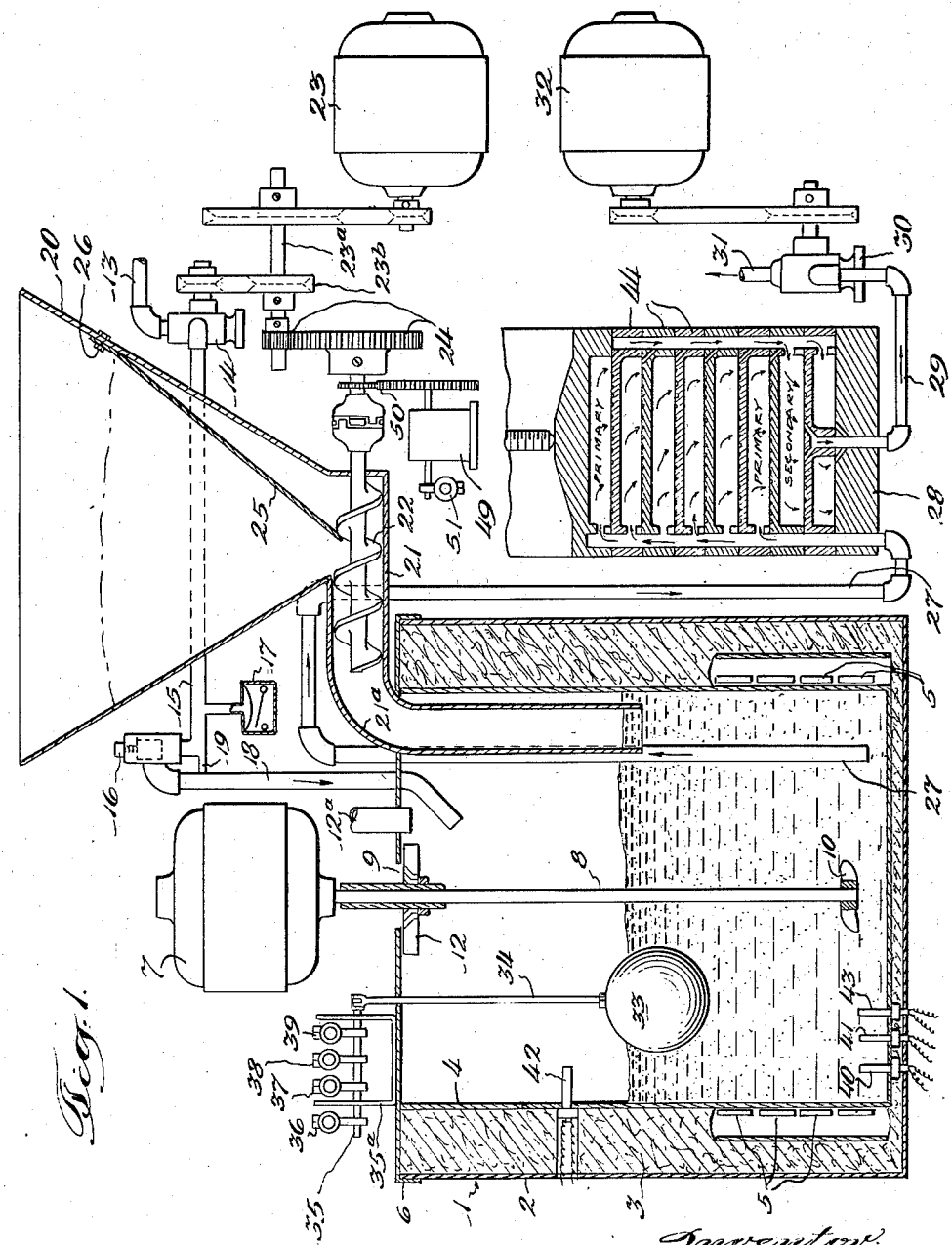

May 4, 1948.   F. L. GERIN   2,440,680
METHOD OF AND APPARATUS FOR OIL PURIFICATION
Filed July 29, 1944   2 Sheets-Sheet 1

Inventor
Fernand L. Gerin
By McCalet, Hendt & Dickinson
Attorneys

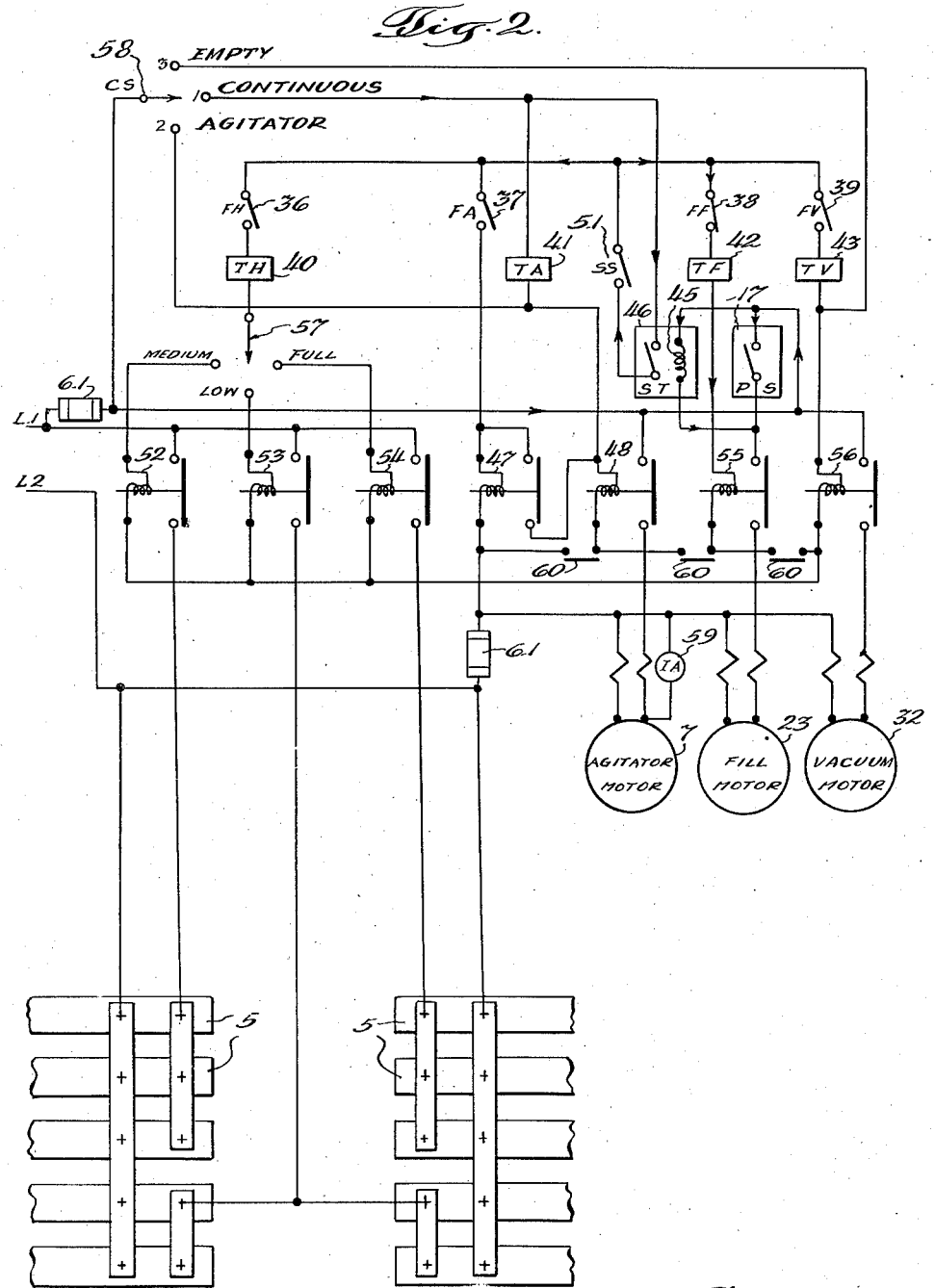

Patented May 4, 1948

2,440,680

UNITED STATES PATENT OFFICE 2,440,680

METHOD OF AND APPARATUS FOR OIL PURIFICATION

Fernand L. Gerin, Sandusky, Ohio, assignor to The Youngstown Miller Company, Belleville, N. J., a corporation of Ohio Application July 29, 1944, Serial No. 547,177

7 Claims. (Cl. 196—16)

This invention pertains to the purification or re-refining of oils for reuse. The invention is applicable primarily to the re-refining of the lubricating oils, but is also applicable to the processing of used mineral, vegetable and animal oils.

It is of course well known in the art that lubricating oils, for example, lose their lubricating properties with continued use. This is partly due to deterioration of the oil itself, and partly to the accumulation in the oil of various volatile substances, such as motor fuel and moisture, and partly to contamination by dirt, metal particles and various products of combustion. The re-refining of oil to recondition it for use is very successfully employed at the present time, the process involving generally the heating of the oil to a temperature well above the boiling point of water, but below the distillation point of the finished oil, while at the same time mixing an adsorbent material with the oil, the oil and adsorbent material being agitated during the heating cycle. The heat drives off the vaporizable impurities; and the adsorbent material has an affinity for some of the foreign bodies which remain in the oil and acts as an aid in the filtering of others. After a predetermined period of heating and agitation, the oil is filtered to separate it from the adsorbent material and its entrained impurities. The filtered oil is then in condition for reuse.

Apparatus which has been successfully developed for the purpose of re-refining oil in the manner above described is essentially for batch operation in that a predetermined quantity of oil and a predetermined quantity of earth are simultaneously agitated and heated for a fixed period of time and then filtered. This requires more or less constant attention on the part of the operator, and, moreover, for a given volume of oil to be treated the size of the equipment must be proportionately large. Furthermore, the filtering equipment is idle much of the time, as it is not functioning when the oil is being heated and agitated. Likewise, the heating and agitating equipment is not utilized while the oil is being drawn off and filtered.

The present invention contemplates a method and apparatus according to which the requisite operations are more or less continuously effected over a given period of time so that a relatively small unit has a relatively large output. The invention further contemplates an apparatus which is substantially automatic, so that the operator does not need to be in continuous attendance.

Incidental advantages of the invention reside in the more efficient use of the adsorptive material and in the provision of certain safety features.

This invention renders feasible the re-refinement of only slightly deteriorated and slightly contaminated oil; thus enabling me more or less continuously to treat the oil from a Diesel engine power plant, so that the oil is kept in substantially uniform condition.

These and other advantages will be more fully apparent from the following particular description of my invention when read in conjunction with the accompanying drawings, in which:

Figure 1 is a more or less schematic view of the apparatus embodying my invention; and Figure 2 is a circuit diagram.

Referring first to Figure 1, the apparatus comprises a reaction tank or still 1, there being a casing 2 in which there is insulation 3. This insulation surrounds the actual reaction vessel which is designated generally as 4.

Surrounding the lower portion of the vessel 4 are electric resistance heaters designated 5. It is by means of these heaters that the oil is raised to the desired temperature (preferably not exceeding 445° F.), and the heaters are preferably disposed below the normal level of oil in vessel 4.

The vessel 4 has a cover 6. Supported above cover 6 is a motor 7, hereinafter sometimes called the "agitator motor," from which is suspended a shaft 8 that passes through an opening 9 in the cover 6 and which carries a propeller-like agitator 10 on its lower end.

Also carried on the shaft 8 immediately under the opening 9 may be an induction fan 12, the function of which is to draw an air current from the outside into the top of the vessel. This air circulating over the top of the heated oil carries away the volatile substances. It accelerates the evaporation of the volatile materials which may be driven off from the oil. The air so induced into the reaction chamber through opening 9 is discharged through another opening in the cover. I have shown a pipe 12a which vents the top of vessel 4.

Provision is made for introducing contaminated oil to be processed through a pipe 13 leading to pump 14, the pressure side of the pump being connected through pipe 15 with pressure relief valve 16 and pressure switch 17. The purpose of relief valve 16 is to maintain on pressure switch 17 a pressure sufficient to maintain its contacts closed so long as the pump 14 is supplied with contaminated oil. Failure of the oil supply or stopping of the pump results in opening of such contacts. Oil leaves relief valve through pipe 18 which discharges into vessel 4. A by-pass 19 of small cross section may short circuit relief valve 16, if desired.

For introducing adsorptive material into the vessel, there is provided a hopper 20 at the bottom of which is a conduit 21 that has a downwardly turned terminal portion 21a that passes through the cover 6 and terminates inside the vessel 4 below the normal operating oil level. There is a screw conveyor 22 in the conduit 21 at the bottom of the hopper. This screw conveyor serves to feed the adsorptive material at a predetermined rate into the vessel 4. In order that the ratio of adsorptive material to oil may at all times be properly proportioned, the pump 14 and the screw 22 are driven by a common motor 23, hereinafter sometimes referred to as the "fill motor." This motor drives a shaft 23a. A belt 23b transmits power from the shaft 23a to the pump 14 while a train of gearing 24 transmits power from the shaft 23a to the screw 22. The ratio of adsorptive earth to contaminated oil may be varied merely by changing the relative radii of the pulleys engaged by the belt 23b or by changing the gearing 24. Once a proper ratio for a given grade of oil has been established, this does not need to be changed.

In order to assure the proper feeding of the adsorptive material, which sometimes tends to pack in the hopper, I provide a simple agitator in the form of a resilient metal strip 25, the upper end of which is bolted or riveted at 26 to the wall of the hopper. The lower free end of this strip is engaged by the screw 22. The screw will tend to carry the strip away from the wall of the hopper a predetermined distance, and then the end of the strip will ride off the screw and snap back to its normal position. In so doing, it will agitate the material to prevent it from packing, and to assure proper feeding of the material.

The mixture of oil and reactive earth or adsorbent material which is kept constantly agitated in the reaction unit is drawn off by suction through a pipe 27. Pipe 27 leads to one end, as for example the lower end, of a multiple plate filter unit 28. Leading from the filter press 28 is a pipe 29 that is connected with the intake side of a suction pump 30. The outlet of the pump 30 is provided with a discharge pipe 31 leading to a clean oil storage vessel or other place to which the processed oil is to be delivered.

Pump 30 is driven by an electric motor 32. This motor is sometimes hereinafter referred to as the "vacuum motor."

The control of the apparatus is dominated by a float 33 in the vessel 4. This float 33 has a vertically extending rod 34 by means of which it is guided and which is moved up and down by the float. The rod 34 is operatively related to a rock shaft 35 mounted in a yoke 35a on the cover 6. Control by the float is exercised through four mercury tube switches mounted on the rock shaft 35, and which are designated in Figure 1 by the reference numerals 36, 37, 38 and 39. For the purpose of clarity in following the circuit diagram, these mercury tube switches are also designated FH (float switch-heat), FA (float switch-agitator), FF (float switch-fill) and FV (float switch-vacuum).

Automatic control is also exercised through four thermostatic switches designated in Figure 1 as 40, 41, 42 and 43, respectively. In the wiring diagram, the thermostatic switches are referred to, for the purpose of clarity, as TH (thermostat-heat), TA (thermostat-agitator), TF (thermostat-fill) and TV (thermostat-vacuum), respectively.

Before describing the electrical control system for the apparatus shown in Figure 1, I will describe the general method of operation. It may be assumed that the apparatus has a capacity for treating 10 gallons of oil per hour. One-half pound of adsorptive earth may be used (for example) in the processing of each gallon of oil. This means that 5 pounds of adsorptive material will be fed to the apparatus in an hour of operation. Each primary filter press plate 44 has a capacity for 4 pounds of spent, or used adsorptive material, and assuming that the press has 6 primary plates, the capacity of the press is 24 pounds of used adsorptive earth or filter cake. The press will be full, therefore, after about 5 hours of use. The apparatus is therefore capable of operating continuously for this period without attention.

Assuming the vessel 4 to be empty, the motor 23 is started. Resultant operation of pump 14 and screw 22 will start to deliver to vessel 4 the contaminated oil and adsorptive material. Motor 23 energized initially, at the volition of the operator, by current flowing through the thermal element 45 of a circuit breaker switch 46 (see Figure 2). This switch 46 is in parallel with pressure switch 17. When the oil flows (which normally occurs in a few seconds after the fill pump motor 23 starts to operate) the pressure switch 17 closes and maintains operation of motor 23. The idea is that if contaminated oil is available to pump 14 it will create effective pressure on switch 17 before the thermal element 45 of breaker switch 46 has interrupted the motor circuit. As the oil flows into the vessel 4 the float 33 will be lifted. When the oil level approaches the normal operating level (indicated in the drawing) float switch 37 energizes relay 47 which in turn energizes relay 48 to set agitator motor 7 in operation. When the oil is about one inch from normal oil level, the float 33 will rock the arm 35 to close the circuit through the mercury switch 36. This will cause the heaters 5 to be energized. When the oil rises to normal level, switch 38 will be opened to stop the motor 23, and switch 39 will be closed to prepare the suction motor 32 for operation. It will not operate, however, until about 50 or 60 minutes later, when the initial pool of oil in vessel 4 will have reached a temperature of about 435° F. This will close the thermostatic switch 43 which is in series with the mercury switch 39, and the motor 32 will start to operate, drawing out a small portion of the oil pool into the filter press 28. This will cause the float 33 to lower, closing the circuit again through mercury switch 38 to start the motor 23 and deliver more oil and more adsorptive material to the vessel 4. The delivery of new oil will lower the temperature of the mass of oil remaining in the vessel 4 so that thermostatic switch 43 will open, stopping the suction pump 30. New oil will continue to run into the vessel 4 until the float again reaches normal level, and when the temperature of the oil again reaches 435° F. (or whatever temperature is selected as the critical temperature), the pump 30 will again withdraw a gallon or so of oil into the filter 28 and the cycle will repeat itself.

Under optimum conditions the heating, the pumping in of contaminated oil and the withdrawal of the hot mixture of oil and adsorptive material will be continuous. A speed reducer 49 is driven from the shaft of conveyor screw 22 through gears 50. The output shaft of speed reducer 49 rotates a mercury stop switch (SS) 51. The latter opens when the conveyor screw 22 has made the necessary number of revolutions to deliver the amount of adsorptive material which will fill the filter press 28. Opening of the switch 51 interrupts the current supplied to the four float switches 36, 37, 38 and 39, and thereby stops the heating of vessel 4, stops supply of contaminated oil to vessel 4, stops delivery of fresh adsorptive material to vessel 4, and stops withdrawal of the hot mixtures to the filter press 28. The agitator 10 continues to run until the temperature in vessel drops to about 300° F. when thermostat 41 opens the circuit of agitator motor 7. The filter press 28 now awaits cleaning by the operator.

The control of current to the heaters 5 and the motors 23 and 32 is preferably exercised through relays 52, 53, 54, 55 and 56. Rotary control switch 57 provides a selection of low, medium or full heating rates. Rotary control switch 58 permits selection of (1) continuous operation, (2) agitation only, or (3) emptying of vessel 4. 59 is a tell-tale light which is energized whenever the agitator motor operates. At 60 are shown conventional motor thermal overload units. 61 are fuses. Leads L1 and L2 are adapted to be connected to a supply of electrical energy.

The thermostat 42, also marked TF (thermostat-fill) in Fig. 2 is located above the oil surface in vessel 4 and is so set that its contacts open at about 350° F. Normally it is subjected to the temperature of the air above the oil, the air temperature usually being about 300° F. in its vicinity. In the event of foaming, the oil, which is at a temperature of about 435° F., submerges the thermostat and causes its contacts to open. This interrupts the supply of contaminated oil and fresh earth to vessel 4. Foaming then subsides, since foaming is principally caused by the vaporization of the water in the oil and earth. The water content of the oil and earth commonly varies from 5% to 25%. After foaming subsides the thermostat 42 is again exposed to the air and the supply of contaminated oil and fresh earth to the vessel 4 may be resumed.

With this method of operation whereby a small part of the total mass of oil in the vessel is intermittently removed and replenished with a small amount of contaminated oil and an appropriate volume of adsorptive material, the material is used to its most effective advantage. The contaminated oil increment is immediately churned through the entire pool. The adsorptive material which has been for a longer time in the vessel has spent much of its adsorptive power, but, upon encountering a contaminated particle of oil, will still have the capacity to remove the most readily adsorbable impurities carried by that particle. On the other hand, the adsorptive material which is freshly introduced into the oil has a higher degree of adsorptive capacity and by the law of averages, most of the oil which it encounters has been in the vessel 4 for some time. With its fresh, highly adsorptive capacity, it will remove the final impurities that have to be extracted. Thus there is created a condition where the fresh material is made available for removing the most tenacious of the impurities, and the spent adsorptive material is brought into contact with impurities which it can easily adsorb. This has much of the advantage of a continuous countercurrent system where the oil flows in one direction and the particles in another. Because the mass of oil in vessel 4 is so large as compared with the volume of fresh oil being brought in, the proportion of oil which has not been adequately treated, that can be drawn over into the filter press, is not sufficient noticeably to affect the quality of the product.

While I have illustrated and described a preferred mechanical and electrical embodiment of the apparatus of my invention, it will be understood that the invention is not restricted to the particular mechanism and circuits shown, but may be otherwise embodied, and that various modifications and changes are within the contemplation of my invention and within the scope of the appended claims.

What I claim as new and desire to secure by Letters Patent is:

1. The method of treating oil to restore it to a usable condition wherein a mass of oil is heated to a predetermined temperature and agitated with an adsorptive material to form a slurry, which method comprises intermittently withdrawing small portions of the slurry comprised of oil and material from the mass undergoing treatment and filtering said portions, and simultaneously replenishing the slurry undergoing treatment with unrestored and unheated oil and additional material in such amounts as to maintain the amounts of oil and material in the slurry substantially constant, and utilizing the drop in temperature caused by the introduction of unheated oil into the slurry to control the amount of slurry withdrawn at any one time.

2. The method of treating oil to restore it to a usable condition wherein a mass of oil is heated to a predetermined temperature and agitated with an adsorptive material to form a slurry, which method comprises intermittently withdrawing small portions of the slurry comprised of oil and material from the mass undergoing treatment and filtering said portions, simultaneously replenishing the slurry undergoing treatment with unrestored and unheated oil and additional material in such amounts as to maintain the amounts of oil and material in the slurry substantially constant, and utilizing the change in temperature of the mass of oil undergoing treatment to control the amount of slurry withdrawn in any one period and the frequency of such periods of withdrawal.

3. An apparatus for the restoration of contaminated oil comprising a still, means for heating the still, a filter press, a conduit connecting the still with the filter press, a suction pump for drawing oil from the still through the filter press, means responsive to the temperature of the mass of oil and adsorptive material in the still for controlling the suction pump, and means responsive to a change of volume of the mass of oil and material in the still for replenishing the mass with additional oil and material.

4. Apparatus for the restoration of used oil comprising a still, means for heating the still, feeding means for introducing unheated used oil and fresh adsorptive material into the still to form a slurry, means for withdrawing the slurry of treated oil and material from the still, filter means for separating the oil and material, a device responsive to the temperature of the slurry in the still for controlling said means for withdrawing the slurry, and a device responsive to the withdrawal of the slurry from the still for controlling said feeding means.

5. Apparatus for the restoration of used oil comprising a still, means for heating the still to a predetermined temperature, means for feeding used oil and adsorptive material to the still in predetermined proportions to form a slurry, a float responsive to the level of the slurry in the still for controlling the operation of the feeding means, a pump for withdrawing slurry from the still, a thermostat responsive to the temperature of the slurry for controlling the operation of said pump, and a switch responsive to the flow of used oil to the still for preventing the operation of the apparatus when the supply of used oil is depleted.

6. Apparatus for restoring used oil comprising a still, motor-driven means for feeding used oil and adsorptive material to the still to form a slurry, a float actuated switch responsive to the level of the slurry in the still for controlling said motor, means for heating the still to a predetermined temperature, motor-driven pump means for withdrawing slurry from the still, a thermostat responsive to the temperature of the slurry for controlling the operation of said motor-driven pump means, and a switch operated by the feeding means for stopping the apparatus when a predetermined total amount of adsorptive material has been fed to the still.

7. Apparatus for the restoration of used oil containing volatile contaminants comprising a still, means for heating the still to a temperature above the boiling point of water, means for feeding used oil and adsorptive material to the still in predetermined proportions to form a slurry which foams when subjected to heat, means including a float responsive to the level of the slurry in the still for normally controlling the operation of the feeding means, and thermostatic means located in the still above the slurry level established by the feeding means under the control of the float, said thermostatic means functioning to stop the supply of oil and material to the still when and while submerged by the foaming slurry.

FERNAND L. GERIN.

REFERENCES CITED

The following references are of record in the file of this patent:

UNITED STATES PATENTS

| Number | Name | Date |
|---|---|---|
| 1,708,488 | Rosenbaum | Apr. 9, 1929 |
| 1,823,185 | Belden | Sept. 15, 1931 |
| 1,831,875 | Moreton | Nov. 17, 1931 |
| 1,831,876 | Moreton | Nov. 17, 1931 |
| 1,966,484 | Brazel et al. | July 17, 1934 |
| 2,061,666 | Miller | Nov. 24, 1936 |
| 2,061,687 | Wilkoff | Nov. 24, 1936 |
| 2,086,763 | Bradford | July 13, 1937 |
| 2,116,344 | Dunmire | May 3, 1938 |
| 2,159,994 | La Breque | May 30, 1939 |
| 2,210,906 | Ells | Aug. 13, 1940 |
| 2,214,671 | Hagan | Sept. 10, 1940 |
| 2,222,475 | Brandt | Nov. 19, 1940 |
| 2,286,369 | Miller | June 16, 1942 |
| 2,319,598 | Harris | May 18, 1943 |
| 2,319,599 | Harris | May 18, 1943 |
| 2,345,595 | Gerin | Apr. 4, 1944 |
| 2,367,851 | Eaton | Jan. 23, 1945 |